(No Model.)
G. H. PHELPS.
ARTIFICIAL WHALEBONE.
No. 251,731. Patented Jan. 3, 1882.
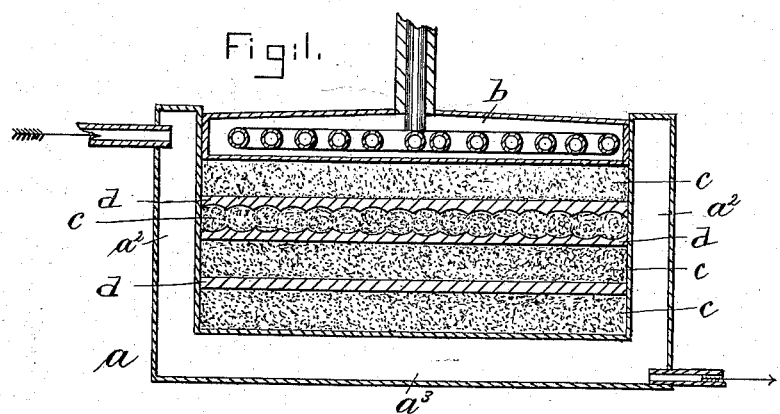
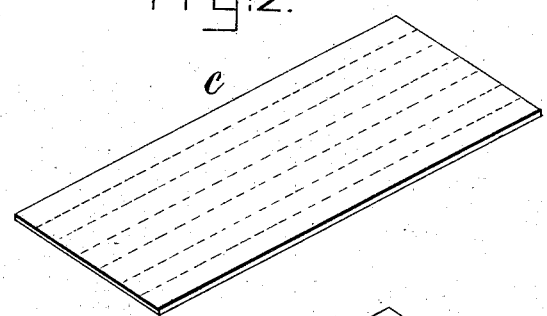
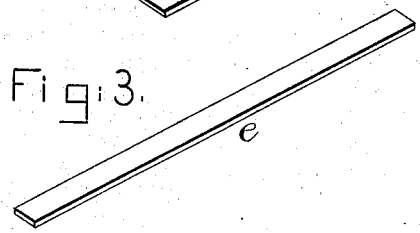
WITNESSES.
L. F. Connor.
B. J. Noyes.
INVENTOR
George H. Phelps.
by Crosby & Gregory
Attys

UNITED STATES PATENT OFFICE.

GEORGE H. PHELPS, OF NEWTON, MASSACHUSETTS.

ARTIFICIAL WHALEBONE.

SPECIFICATION forming part of Letters Patent No. 251,731, dated January 3, 1882.

Application filed October 25, 1881. (No model.)

*To all whom it may concern:*

Be it known that I, GEORGE H. PHELPS, of Newton, Middlesex county, Massachusetts, have invented an Improvement in Artificial Whalebone, of which the following description, in connection with the accompanying drawings, is a specification.

This invention has for its object the production of an artificial substance called by me "whaleboline," to be employed chiefly as a substitute for whalebone for corsets, whips, and other purposes where whalebone is commonly used.

Prior to this my invention various substitutes for whalebone have been devised—such, for instance, as horn, cane, reeds, and rawhide—each cut into shape, and usually prepared by some treatment to make it suitable for the use intended. In all these plans the shapes to be used are formed by the separation into smaller size of certain larger solids found in nature and making them more elastic; but in the practice of my invention I unite together numerous small particles of material into a larger mass, thus composing slabs or sheets of material, which are subsequently subdivided into strips or ribs of the proper width and length.

My novel whaleboline is composed of vegetable or animal fibers, preferably long fiber, such as tampico or istle, which is bound together to form sheets, slabs, or strips, the latter having sufficient size, elasticity, and strength, owing to the accumulation of numerous individual strands side by side, the said accumulated strands being bound or united together to form a narrow strip or rib of greater diameter and strength than the diameter and strength of the separate individual fibers from which this strip or rib is composed. I prefer to unite the individual fibers composing the strip or rib of whaleboline by means of a cementitious, glutinous, plastic, or adhesive compound, which, applied to the fibers, will cause them to adhere, and thus form a stiffer, stronger substance; and I prefer that the plastic or adhesive compound be water-proof, or substantially so, and also that it shall withstand considerable heat—more than that derivable from the body—without being affected thereby; and preferably the plastic or adhesive compound will be made odorless. Whalebone is composed of numerous strong elastic fibers united by a tough cartilaginous substance consisting largely of albumen and gluten.

Figure 1 represents in vertical cross-section an apparatus to be employed by me in the manufacture of whaleboline. Fig. 2 represents a slab of whaleboline, the dotted lines indicating how it may be cut into strips; and Fig. 3 represents one of my whaleboline strips.

To manufacture whaleboline, I take preferably tampico or istle fiber, cleanse it, and place it in a vessel—preferably a metallic vessel—where it can lie out straight, with the individual fibers parallel, or nearly so. I apply to it a solution of the cementitious, glutinous, or other adhesive substance to be first employed to saturate the said fibers. This substance so employed to saturate and soften the fiber will preferably be a thin solution of gelatine—say half an ounce of good gelatine dissolved in one quart of water—the said substance being kept at a heat of 200° Fahrenheit (more or less) for one or two hours. After this the fiber so treated is removed from the vessel, drained, and partially dried; but while yet quite damp the said material is laid or placed on a bed or support of metal or other hard material and drawn, combed, or brushed out to form a flat slab of the requisite thickness, according to the thickness of the article to be made from the slab. While in this condition the said material is thoroughly saturated with a solution of chromic acid—say one ounce chromic acid to one pint of water, more or less. I then again partially dry the said material in a dark place and apply a thick warm solution of gelatine in water, the same being preferably carefully worked into the mass by combing or brushing, or both, after which the slab is dried in the light, exposing it to the sun as much as possible for, say, from six to ten days, the slab in the meantime being turned frequently.

A slab made so far as described would be limited in one direction by the length of the fiber used, and to a thickness not exceeding, say, two or three fibers.

In arranging the fibers it is best to keep the butt-ends in the same direction, or all one way, and so arranged the slab will be thicker along one than along its other edge, which is made serviceable when subsequently the thinner edge of one slab is lapped over the thinner edge of another slab, as when a number of slabs are to be united together by pressure to form a slab of indefinite length in the direction in which the fiber is extended in the slab.

To unite two or more slabs, I take a strong metallic box, $a$, constructed with hollow steam-tight sides $a^2$ and bottom $a^3$, and above it place a hollow steam top or lid, $b$, to fit into it as a piston. A sufficient number of slabs, $c$, to make a compound slab of the proper thickness are laid in this box with their thin ends overlapping, say, about one-eighth of an inch. Then on these slabs I lay a sheet of metal, $d$, and then again other layers of slabs and metal until the box is filled, when the cover $b$ is forced down by a powerful press, consolidating the several slabs which are in direct contact into single homogeneous slabs. While being pressed together steam is admitted into the box and cover and the whole kept hot and under pressure from three to twenty-four hours, according to the number and thickness of the slabs. I have found that the greater the pressure, so long as it is not a disintegrating pressure, the stiffer and more elastic the slab and strip or rib produced therefrom. After becoming cool, pressure is relaxed, and the slabs, composed each of several slabs, are removed and cut into strips or ribs $e$ of the proper width and length. The strips should be exposed to light and air before being used. By this process it is obvious that the slabs or sheets of whaleboline may be made of any required width, length, and thickness.

If desired, the material composing the slab may be put into molds of the shape it is desired the finished strip or rib to have, such molds being square, round, or of other shape in cross-section.

Instead of employing flat plates $d$, smooth on their sides, I may employ metal plates grooved at each side to correspond in shape with the cross-section desired for the rib or strip or finished thing to be produced. The drawing shows two of these plates grooved to produce strips with rounded edges.

Instead of gelatine and chromic acid, which I prefer, as in the process described, I may employ a vulcanizable preparation of caoutchouc or india-rubber; or I may use any other well-known adhesive or cementitious substance having the properties of the substances already mentioned, said substance being sufficiently tough and adhesive to retain the fibers together.

Instead of tampico and istle, I may employ long horse-hair, such as used in hair-cloth for furniture, or jute, manila, or esparto, or other similar fibers.

The box $a$ will be supplied with steam from any suitable steam-generator, and will have a pipe to take away water of condensation.

The cover may be heated by means of a pipe laid on or coiled thereon, the end of the pipe being extended out through the cover to permit the escape of steam or water.

One of the first steps in my process, as it will be seen, is arranging the tampico or istle fibers closely together to be coated with gelatine. In some instances I may connect them together mechanically—say in a loom—the said fiber being used as a weft, the smallest number of warps possible being used to hold the tampico or istle strands parallel, the said strands being beat up closely together, or so manipulated with relation to the said warps as to permit the strands to be laid one over the other to a certain extent, as in weaving thick fabrics.

I claim—

1. As an improved article of manufacture, whaleboline or substitute for whalebone, it being composed of long fibers, such as described, arranged in mass, with individual strands parallel, the said strands being united together to form strips or ribs, substantially as described.

2. A sheet of whaleboline composed of fibrous material, gelatine, and chromic acid, or equivalents, united under pressure, substantially as described.

3. That improvement in the art or method of forming whaleboline or substitute for whalebone which consists in arranging the fibers of tampico, istle, or equivalent fiber side by side, coating or treating the same with a solution of gelatine, and then with chromic acid, and then subjecting the same to the action of light, heat, and pressure to form the said fiber into a homogeneous substance adapted to be cut into strips or ribs, substantially as described.

4. That improvement in the art or method of manufacturing whaleboline or artificial whalebone which consists in uniting the fibers of tampico, istle, or equivalent substance with a cementitious or glutinous material, substantially as described.

In testimony whereof I have signed my name to this specification in the presence of two subscribing witnesses.

GEORGE H. PHELPS.

Witnesses:
G. W. GREGORY,
W. H. SIGSTON.